July 12, 1960    H. A. RINTOUL ET AL    2,944,432
PRESSURE-RESPONSIVE ALTITUDE CONTROL DEVICE
Filed June 21, 1954    4 Sheets-Sheet 1
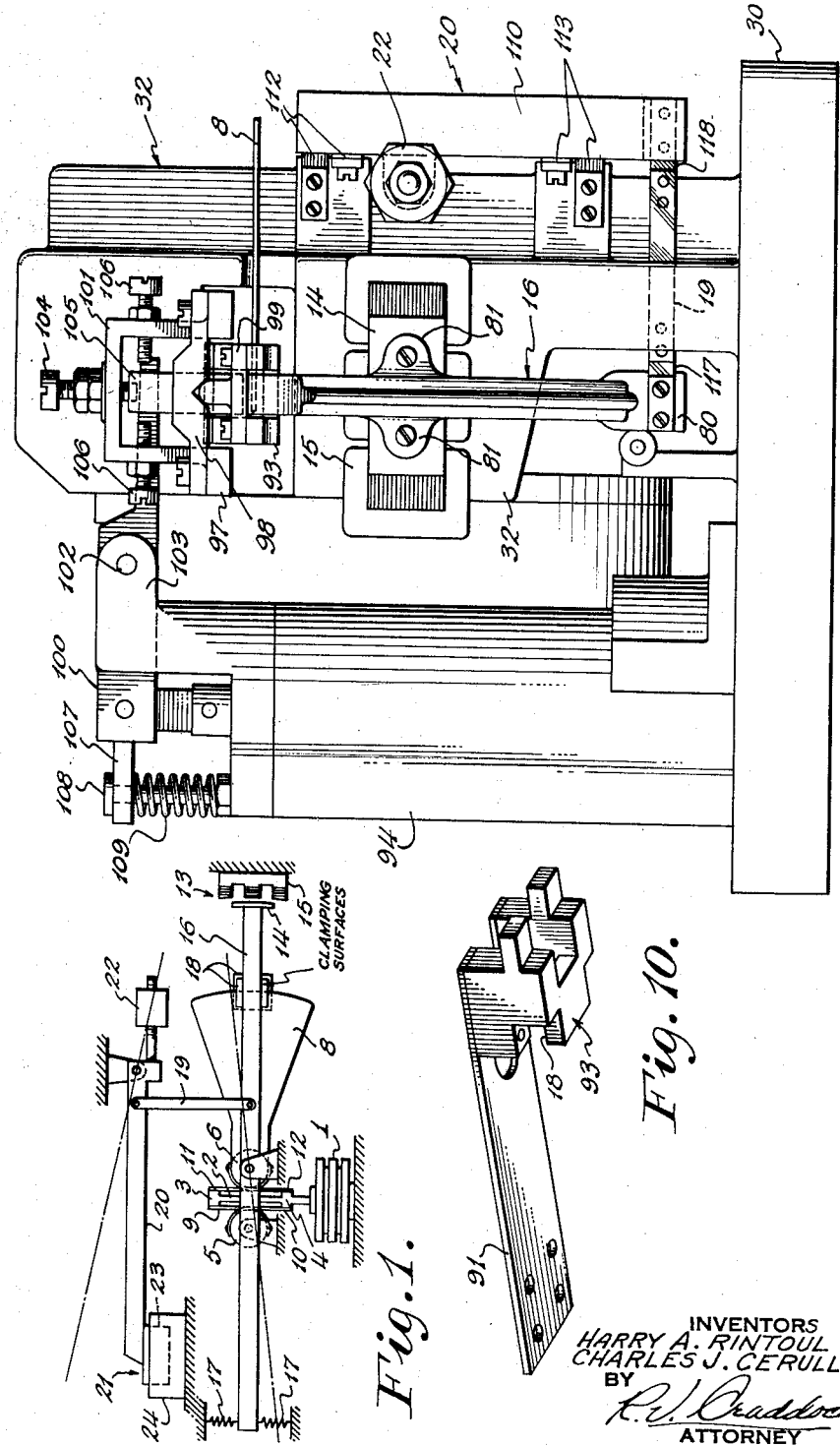
INVENTORS
HARRY A. RINTOUL
CHARLES J. CERULLI
BY
ATTORNEY

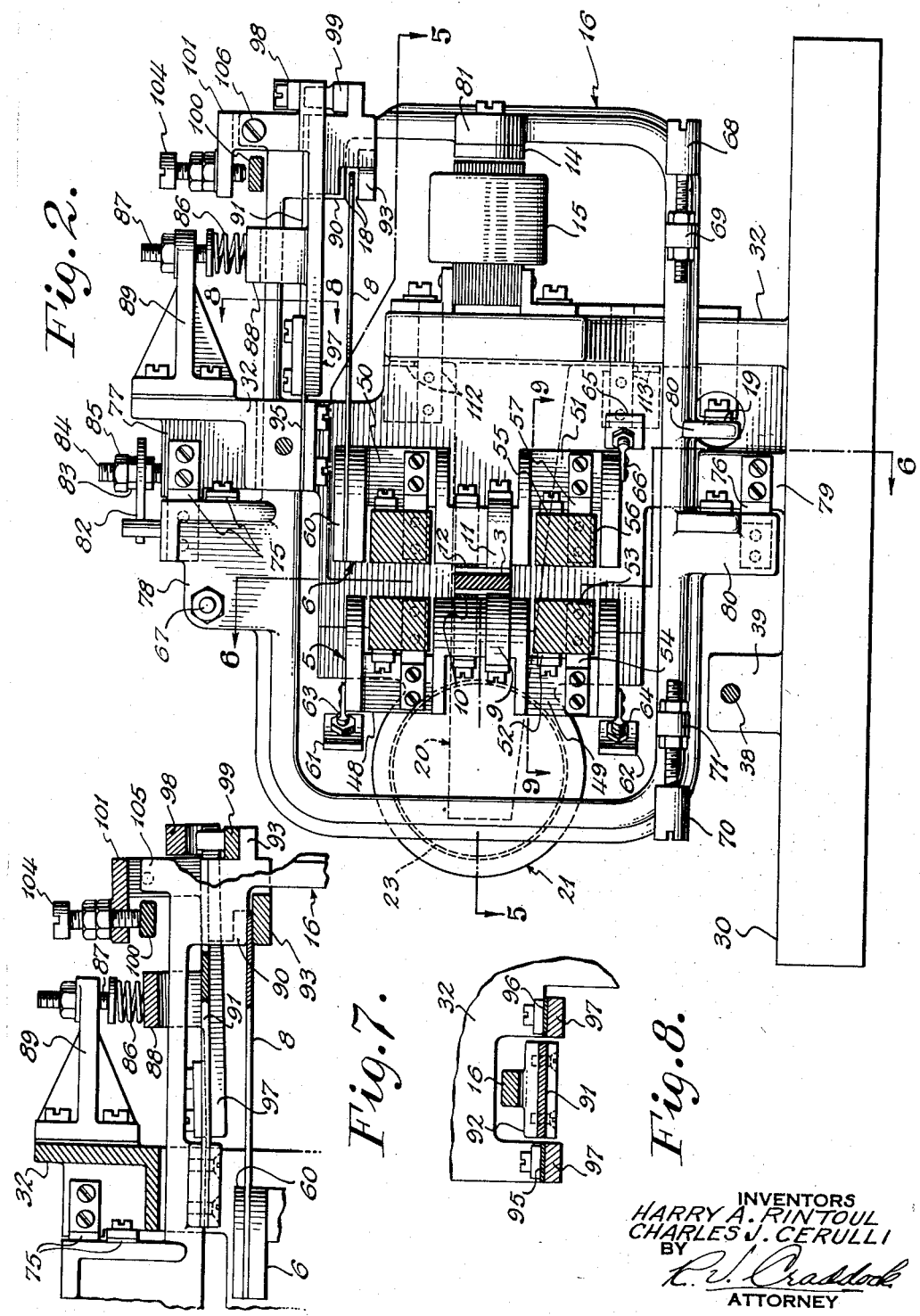

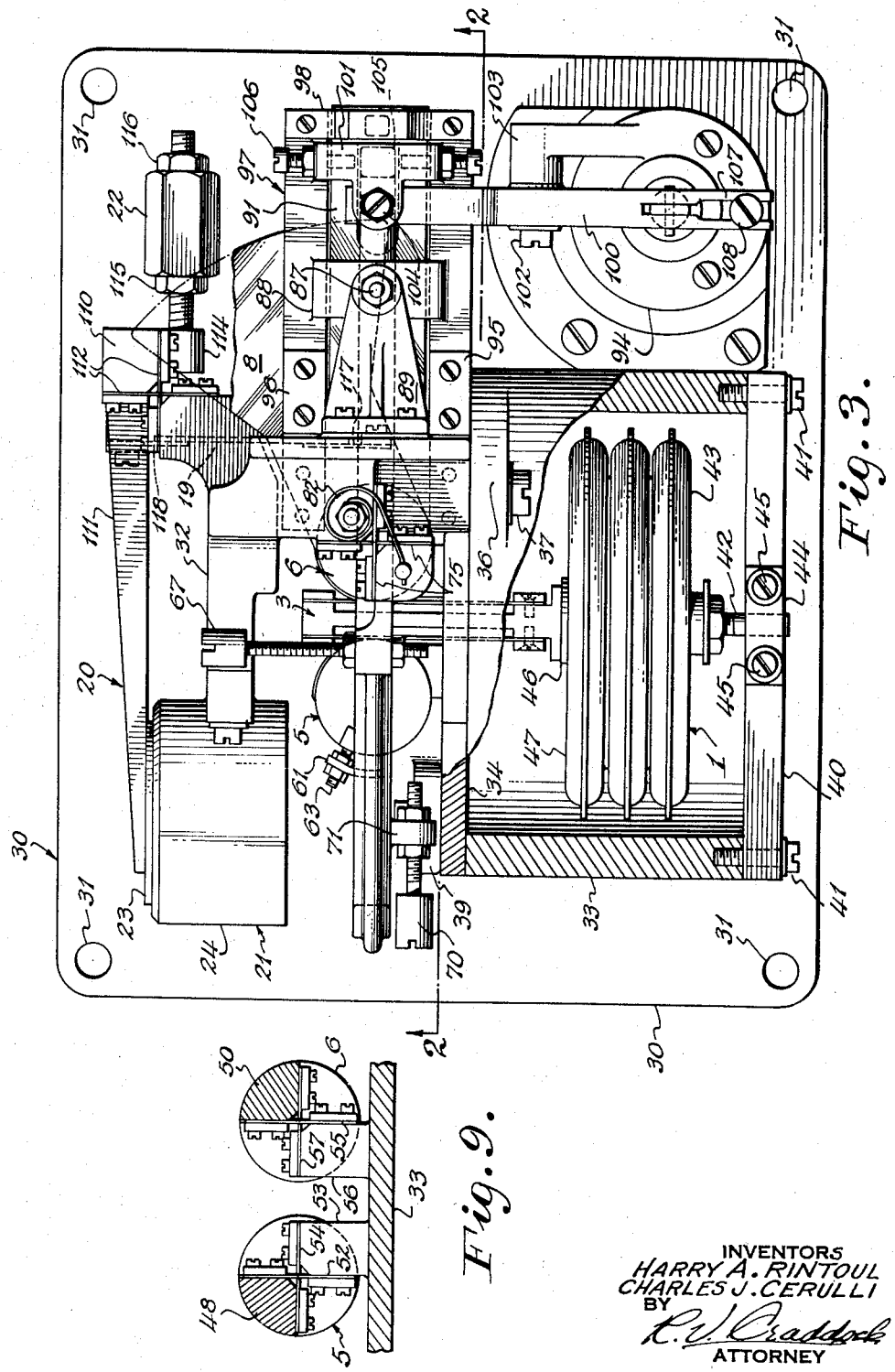

INVENTORS
HARRY A. RINTOUL
CHARLES J. CERULLI
BY
ATTORNEY

United States Patent Office 2,944,432
Patented July 12, 1960

2,944,432

PRESSURE-RESPONSIVE ALTITUDE CONTROL DEVICE

Harry A. Rintoul, Freeport, N.Y., and Charles J. Cerulli, Waterbury, Conn., assignors to Sperry Rand Corporation, a corporation of Delaware Filed June 21, 1954, Ser. No. 438,242

6 Claims. (Cl. 74—96)

Our invention relates to improvements in barometric pressure responsive controller devices for producing signal outputs useful in conjunction with an aircraft automatic pilot for controlling an aircraft in altitude.

Devices of the foregoing type generally include an aneroid element such as a partially evacuated bellows which is connected by a linkage to actuate the driver portion of a clutch. The driver portion of the clutch is then often connected by an additional linkage to a signal generator, such that when the clutch is engaged, a signal is produced in accordance with the volumetric changes of the bellows in response to ambient pressure changes. Hence, when the signal is employed for controlling altitude through an aircraft automatic pilot, it controls the craft to maintain the altitude at which the clutch is engaged.

The linkages on either side of the clutch usually constitute elements of considerable importance, since they may be arranged to multiply the motion of the bellows as received at the signal generator, thereby to provide increased sensitivity. In other cases, such linkages may also be essential for converting the lineal motion of the bellows to a rotary motion in order to actuate a clutch and/or a signal generator requiring a rotary mechanical input. Hence, in a number of respects, linkages of various sorts are desirable constituents of the signal-generating type of pressure responsive controller.

In a number of other respects, however, multiplying and motion-transforming linkages may offer serious disadvantages to their use in devices of the nature described. Chief among these disadvantages is the susceptibility of such linkages, by virtue of their mass and pivotal mountings, toward reacting motion-wise to forces of acceleration applied generally to the devices of which they form part. Such acceleration-induced movements can bring about signal outputs that are indistinguishable from the outputs derived from movements induced by changes in pressure.

Acceleration forces are common in aircraft; and stem, for example, from vibrations produced by a number of factors including power plant characteristics, air speed, and the condition of the air. Hence, the acceleration-response of linkages unless effectively overcome, can impose material restrictions on the extent to which such linkages may be usefully employed in aircraft barometric-type altitude controllers, particularly where exceptional pressure-sensitivity is sought.

Acceleration forces, however, are not the only source of difficulty encountered in prior art altitude controllers of the bellows-clutch-signal generator type. The clutching operation itself involves the generation of forces which are apt to bring about some movement of one or more of the controller components in the direction in which they normally move in response to pressure changes. Hence, unless these forces are effectively neutralized, they can impose further material restrictions on the use of altitude controllers as heretofore constructed.

Accordingly, a principal object of our invention is to provide a pressure responsive controller device comprising a barometric element engageable to actuate a signal generator, the construction of the controller being such as to render the same highly sensitive to altitude or ambient pressure changes yet substantially insensitive both to accelerations acting thereupon and to such non-pressure-derived disturbances as may be caused by forces exerted in engaging the barometric element to actuate the signal generator.

Another object is the provision of an aircraft altitude control device of the barometric type characterized by exceptionally accurate performance and notably simple adjustment and calibration.

With the foregoing and still other objects in view, our invention includes the novel combinations and arrangements of elements described below and illustrated in the accompanying drawings, in which:

Fig. 1 is a schematic representation of our device;

Fig. 2 is a sectional view taken on line 2—2 of Fig. 3;

Fig. 3 is a top plan view of a preferred embodiment of our invention partially in section;

Fig. 4 is an end elevation view as seen from the right of Fig. 2;

Fig. 7 is a side elevation view of the preferred clutch and operating mechanism therefor;

Fig. 8 is a sectional view taken on line 8—8 of Fig. 2;

Fig. 9 is a sectional view taken on line 9—9 of Fig. 2; and

Fig. 10 is a perspective view of the movable clamping surface of the clutch and its resilient mounting arrangement.

Figure 5:
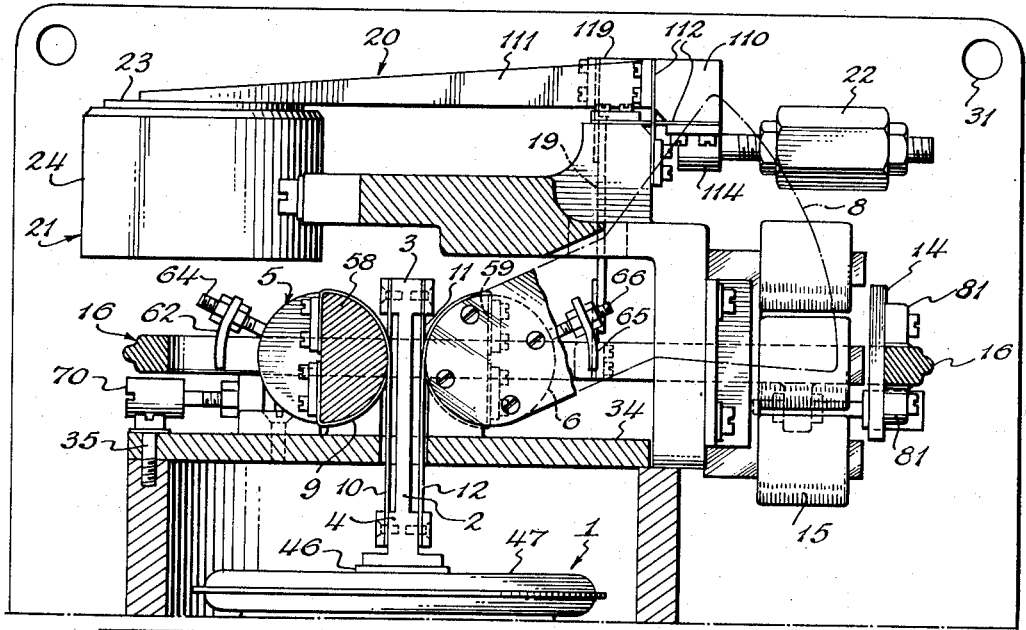
Fig. 5 is a sectional view taken on line 5—5 of Fig. 2.

Fig. 1 is provided to show in a simplified or schematic sense several of the more important constructional features of our device which serve to render the same highly sensitive to pressure changes yet substantially insensitive both to accelerations acting thereupon and to such non-pressure-derived disturbances as may be caused by the forces exerted in connecting the barometric element to a signal generator.

Referring to Fig. 1, a partially evacuated bellows 1 of a standard temperature-compensated type has one of its end-walls fixed and its other end-wall lineally movable with volumetric changes of the bellows in response to changes in the surrounding external pressure as would occur, for example, with changes in altitude. Connected to the movable end-wall of bellows 1 and extending axially therefrom is a bar 2 having spaced transverse portions 3, 4 arranged to form a generally H-shaped member which moves axially of the bellows with movements of the movable end-wall. The H-shaped member is connected, by means presently to be described, to counter-rotate two generally cylindrical members 5, 6 mounted respectively for rotation about spaced parallel axes located on opposite sides of bar 2 intermediate transverse portions 3, 4.

Member 6 has affixed thereto the driver portion of a clutch. The driver portion consists of a thin planar sector 8 whose major surface planes are perpendicular to the rotational axes of members 5, 6.

The connections between the H-shaped member affixed to the movable end-wall of bellows 1 and members 5, 6 for counter-rotating the latter preferably comprises respective pairs of substantially identical flexible bands 9, 10 and 11, 12. Band 9 is given a partial turn around member 5 in one direction and is secured at one end to member 5 while its other end is secured to transverse portion 3. Band 10 is given a partial turn around member 5 in the other direction and is secured at one end to member 5 while its other end is secured to transverse portion 4.

Enroute from member 5 to their respective connections to transverse portions 3 and 4, bands 9, 10 cross one above the other. Substantially no slack exists in the bands. Hence, member 5 is rotatably driven in accordance with the lineal movements of bellows 1 within an angular range substantially equal to the average of the central angles subtended in member 5 by the portions of bands 9, 10 in wrapped contact therewith.

Bands 11, 12 are employed to connect member 6 respectively to transverse portions 3, 4 in the same manner in which bands 9, 10 were employed to connect member 5, and are arranged correspondingly to subtend central angles in member 6 substantially equal to those subtended in member 5. Hence, member 6 is also rotatably driven in accordance with the lineal movement of bellows 1. However, being on the opposite side of bar 2, member 6 may only be rotated counter to the rotation of member 5.

Member 5 and member 6 (including sector 8) are dynamically balanced, as coupled, so as to render such members insensitive to accelerations applied generally thereto. That is to say, the moments of inertia of member 5 and member 6 (including sector 8) about their respective axes are so related that the force exerted on bar 2 due to the torque of member 5 in response to an acceleration applied generally to both members is equal and opposite to the force exerted on bar 2 due to the torque response of member 6. By this arrangement, members 5 and 6 are prevented from pivotally reacting to accelerations applied generally thereto, yet are rendered free to rotate in response to lineal movements of bellows 1.

The clutch of which sector 8 forms the driver portion is employed to connect bellows 1 to a signal-generator 13 having a movable part 14 and a fixed part 15, preferably the armature and core portions, respectively, of a conventional E-transformer pick-off. In use, it is contemplated that the inner leg of pick-off core 15 will be excited from a suitable source of alternating current, while a series connection of the outer legs will be connected to provide a signal output of reversible phase in controlling relation to a utilization device such as the elevator control channel of an aircraft automatic pilot.

Armature 14 is attached to one end of a longitudinally-extending lever 16 which is suitably mounted for rotation about the pivotal axis of clutch-sector 8. The other end of lever 16 is connected to a pair of restoring springs 17 (of suitable spring constant) which are arranged (in a well-known manner) to position lever 16 such that armature 14 is automatically oriented to its null position with respect to core 15 when the clutch is unoperated, i.e., during intervals of no connection between bellows 1 and generator 13.

The driven portion of the clutch comprises a pair of clamping elements connected to lever 16 intermediate its pivotal axis and armature 14 and having opposed surfaces 18 arranged one above the other, as viewed in the drawings, in spaced relation such that sector 8 normally freely passes therebetween. The clutch is operated by clamping the surfaces 18 against sector 8; and the clamping force thereby exerted is in a direction parallel to the common rotational axis of the sector and lever 16. With the clamping force thus directed, any disturbance or movement that may be imparted by the force, itself, directly or indirectly to one or more of the several parts of the present device will not have a component of the same direction in which such part or parts move in response to atmospheric pressure changes.

A preferred arrangement for operating the clutch will be described in detail in connection with the remaining figures in the case.

Having a common pivotal axis, sector 8 and lever 16 rotate in unison during intervals of clutch operation as bellows 1 expands or contracts from the volumetric condition it has at the instant of clamping. Moreover, the linear distance through which armature 14 is moved is considerably greater than the distance through which the bellows-connected H-shaped member is moved for a given lineal displacement of bellows 1. In other words, the linkage between the bellows and pick-off serves to multiply its input motion whereby to provide an exceedingly high degree of sensitivity to minute changes in pressure.

A rigid link 19 is pivotally connected at one of its ends to lever 16 at a point intermediate the clamping elements and the lever's pivotal axis. The other end of link 19 is pivotally connected to another longitudinally-extending lever 20 which, in turn, is mounted for rotation about a pivotal axis parallel to the axis of lever 16 and sector 8. By locating the pivotal axis mounting of lever 20 on the side of link 19 opposite the side where the pivotal axis of lever 16 is located, we constrain lever 20 to rotate only in a direction opposite or counter to whatever direction is rotated by lever 16.

Lever 20 is provided at one end thereof with the movable cup portion 23 of a conventional eddy-current type damper 21 having a fixed magnetic core portion 24. The other end of the lever is supplied with a threaded extension over which an internally-threaded weight 22 is adjusted to statically balance lever 20 about its pivotal axis before link 19 is connected thereto. For purposes of simplification, it is assumed in Fig. 1 that lever 16 is so proportioned that it also is statically balanced before its connection to link 19.

In fact, the mass distribution in one lever with respect to the mass distribution in the other lever is such that not only are the individual levers statically balanced, but on connecting the levers by link 19 they are dynamically balanced as well. That is to say, the moments of inertia of the levers about their respective axes are so related that the torque produced at the point of coupling of link 19 to one lever in response to an acceleration applied generally to both levers is equal and opposite to the torque produced at the point of coupling of link 19 to the other lever. Hence, if the distance between the pivotal axis of lever 16 and the point of coupling of lever 16 is twice the distance between the pivotal axis of lever 20 and the point of coupling of lever 20, then the moment of inertia of lever 16 with respect to its pivotal axis will be twice the moment of inertia of lever 20 with respect to its pivotal axis.

The relation of the moments of inertia of the respective levers, together with their constraint to rotate only in counter directions, results in their having a net insensitivity to accelerations after the same fashion as the net insensitivity possessed by member 5 and member 6 including sector 8. These net insensitivities to acceleration remain unchanged on operation of the clutch, such that levers 16, 20 pivotally respond during such operation only to the rotating or driving force exerted by the driver portion (sector 8) of the clutch, hence only to the lineal displacement of the movable end-wall of bellows 1.

Damper 21 is provided to damp or resist oscillatory motion tending to occur in the various pivotal elements of our system, due for example, to the characteristic resiliency in the response of a bellows to rapid pressure transients.

Figure 6:
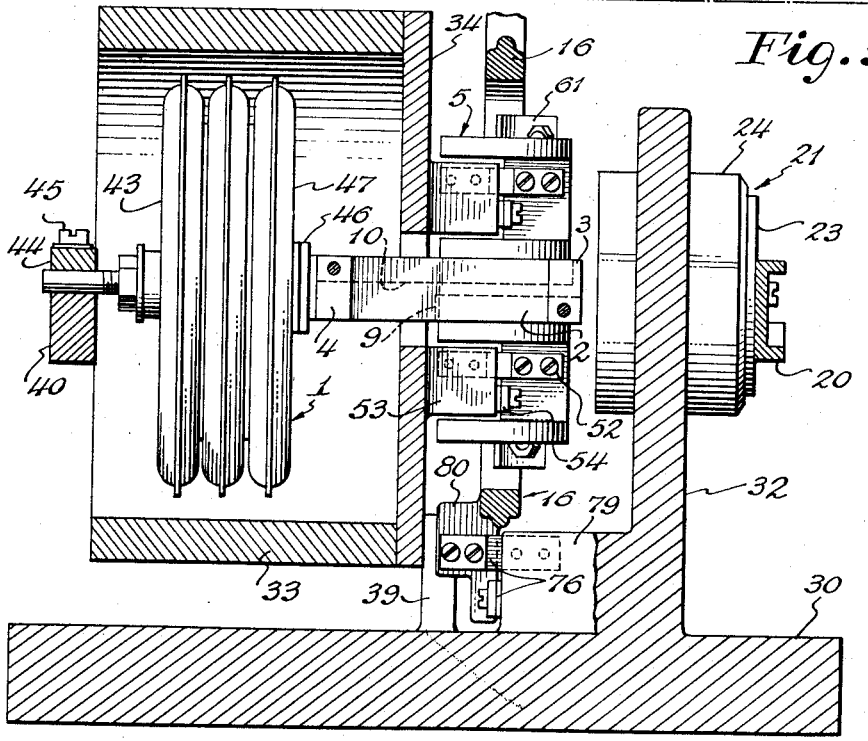
Fig. 6 is a sectional view taken on line 6—6 of Fig. 2.

Having, in connection with the simplified showing of Fig. 1, described several of the more important constructional features of our device which serve to render the same highly sensitive to pressure changes yet substantially insensitive both to accelerations applied generally thereto and to such non-pressure-derived disturbances as may be caused by the forces exerted in connecting the bellows to the signal generator, we proceed now to describe a preferred embodiment of our invention as illustrated in Figs. 2–9, inclusive.

In Figs. 2–9, we show preferred configurations of the components previously described in a general sense in connection with Fig. 1. Hence, the numerals used in Fig.

1 to designate such components are again used wherever appropriate. Moreover, the relative arrangement and principal functions of such components remains substantially the same as in Fig. 1. With these components, however, we have combined other desirable components and functions for enhancing the practicality of our apparatus and furthering the fulfillment of our stated objects, as will become apparent from the ensuing description.

All of the elements of our device are preferably mounted on a base 30 which is provided with a number of holes 31 drilled therethrough by which it may be bolted securely to an aircraft.

A rigid center post 32 integral with base 30 and extending upwardly therefrom supports core portion 24 of damper 21, E-pickoff stator 15, a clutch-operating mechanism, the pivotal mountings for output levers 16, 20, and a spring device for centering the levers with respect to stator 15. Center post 32 also helps to support a rigid housing 33 for bellows 1, and housing 33 supports the bellows and the pivotal mountings for cylindrical members 5, 6.

Housing 33 is preferably a cylindrical structure having one end open for access purposes and the other end substantially closed for stiffening purposes by a flat plate 34 fastened thereto by a plurality of screws 35. An ear 36 projects radially from housing 33 near end plate 34 and is provided with a drilled hole to accommodate a screw 37 for securing the housing to center post 32. Housing 33 is also fastened by a screw 38 to a boss 39 integral with base 30. Thus secured and fastened, housing 33 has its cylinder axis substantially parallel to the upper surface of base 30, and has its open end facing outwardly of the base, as viewed in Figs. 3 and 6.

A bar 40 is secured substantially diametrically across the open end of housing 33 by a pair of screws 41. A mounting stud 42 integral with one end-wall 43 of bellows 1 and projecting axially therefrom is clamped to bar 40 by a clamping block 44 and a pair of screws 45 so as to fix end-wall 43 securely to housing 33 and base 30. Thus mounted to the base, bellows 1 is freely enclosed in housing 33 and substantially coaxial therewith.

The axially-extending H-shaped members 2, 3, 4 previously described in Fig. 1 is affixed, as by brazing, to a boss 46 on the inboard or movable end-wall 47 of bellows 1. The two generally cylindrical members 5, 6 flanking the H-shaped member are pivotally mounted on housing 33 by means, preferably, of a plurality of pairs of orthogonally-disposed strip-springs, two pairs of which are shown in detail in Fig. 9 respectively supporting members 5, 6.

Portions 48, 49 and 50, 51 of the upper and lower regions respectively of members 5, 6 are of quadrantal or right angle circular sector cross-section. To each vertical planar face of each of these portions is clamped a strip-spring which is also clamped to a corresponding vertical planar face of a generally cube-shaped anchoring block formed integrally with housing 33.

In Fig. 9, for example, a strip-spring 52 is clamped to one face of quadrantal portion 48 of member 5 and to a corresponding face of a first anchoring block 53 forming part of housing 33. Immediately below and adjacent strip-spring 52 is another strip-spring 54 clamped to the other face of quadrantal portion 48 and to a corresponding face of block 53. Similarly for member 6, a strip-spring 55 is clamped to one face of quadrantal portion 50 and to a corresponding face of a second anchoring block 56 also integral with housing 33, while a strip-spring 57 below and adjacent spring 55 is clamped to the other face of quadrantal portion 50 and to a corresponding face of block 56. In this manner, members 5, 6 are mounted by substantially friction-free means to pivot about spaced parallel vertical axes.

Preferably, portions 58, 59 of the central regions of members 5, 6, respectively, are of semi-circular cross-section so as to provide convenient surfaces for clamping flexible bands 9, 10 and 11, 12 to said members. As viewed in Fig. 5, band 10 is clamped at one end to the vertical planar face of central portion 58, and is partially wrapped around member 5 in a clockwise direction toward the connection of its other end to transverse portion 4 of bellows-connected bar 2. Band 9 is clamped to central portion 58 below the level of band 10 and is partially wrapped around member 5 in a counter-clockwise direction enroute to its clamped connection to transverse portion 3 of bar 2. In like manner, bands 11, 12 are affixed at one end to transverse portions 3, 4, respectively, and are partially wrapped in opposite directions around member 6, and the other end in each instance being affixed to the vertical planar face of portion 59.

The fastening of clutch driver sector 8 to member 6 is effected by securely sandwiching a portion of the narrow end of the sector between the top of member 6 and a circular clamping plate 60 (Fig. 2).

The inertia of member 5 is preferably increased by a pair of weights 61, 62 affixed respectively to a pair of arms 63, 64 connected to the top and bottom of said member and extending radially therefrom. Member 6, on the other hand, is provided with but one weight 65 affixed to an arm 66 connected to the bottom of said member and extending radially therefrom, clutch sector 8 on member 6 serving as an inertia counterpart of weight 61 on member 5. We have threaded the arms 63, 64, 66 and have secured each weight between two nuts meshing with the threads so that adjustments may be conveniently made to the lever arm of each weight in order so to relate the moments of inertia of members 5, 6 with respect to their respective pivotal axes as to provide the desired insensitivity of these members to accelerations applied generally thereto. When subjected to linear accelerations, balance weights 61, 62, 65 and clutch sector 8 counteract the combined weight of the bellows 1 and the H-shaped member. Rotational acceleration effects around the pivotal axis of one of the members 5, 6 are counteracted by the rotational acceleration effects around the pivotal axis of the other member which tends to position the H-shaped member in the opposite direction.

Lever 16 is preferably a rectangular frame-like structure. The rotational mounting therefor which gives it a pivotal axis coincident with the pivotal axis of clutch sector 8 is preferably provided by two pairs of orthogonally-disposed strip-springs 75, 76 which are also arranged to support lever 16 so that the longer sides of the lever are substantially parallel to the major surface planes of base 30 while its shorter sides are substantially perpendicular to said base surfaces.

The strip-springs of pair 75 are clamped at one end to a pair of vertical planar surfaces 77 disposed at right angles with respect to each other on center post 32, and at the other end to a corresponding pair of surfaces provided on an ear 78 extending upwardly from the upper side of lever 16. In like fashion, spring pair 76 is connected between a pair of vertical planar surfaces disposed at right angles with respect to each other on a boss 79 integral with base 30 and a corresponding pair of surfaces provided on an ear 80 depending downwardly from the lower side of lever 16.

The anchoring surfaces for strip-spring pairs 75, 76 on center post 32 and boss 79 are preferably oriented thereon such that lever 16 tends to assume a position at which its rectangular plane is generally parallel to the planes of end-walls 43, 47 of bellows 1.

Armature 14 of E-pickoff 13 is preferably mounted to face inwardly on a pair of wing-like supporting members 81 which project transversely from the center of the right-hand side of lever 16 as viewed in Fig. 2. Thus mounted, the armature cooperates with the core portion 15 of pickoff 13 which is preferably secured to center post 32 so that the core lies in a portion of the space surrounded by the frame-like structure of lever 16.

Of the opposed clamping surfaces 18 of the driven portion of the clutch, one surface is stationary with respect to lever 16 and is preferably formed by an inner step 90 in the upper right-hand corner of the lever as viewed in Figs. 2 and 7. The other clamping surface is movable through being mounted at one end of a relatively stiff flat spring 91 (Fig. 8), the other end of which is secured to a pad 92 forming a horizontally-disposed inner surface on the upper side of lever 16 about midway between the lever's vertical sides. The movable clamping surface preferably consists of the foot of a horizontally-disposed generally Y-shaped member 93 (Fig. 10), each of the side-legs of which are secured to spring 91 by screws engaging upwardly-extending portions of said side-legs and corresponding bifurcated portions of the spring. Moreover, the side-legs of member 93 and the bifurcated portions of the spring preferably are arranged to flank the upper portion of the right-hand side of lever 16.

Spring 91 urges the movable clamping surface to bear against the stationary clamping surface, driver sector 8 being disposed therebetween and being capable of yielding sufficiently in the directions of the clamping force to allow it to be securely clamped between surfaces 18. The arrangement of clamping surfaces 18 in relation to sector 8 is such that all the clamping force of spring 91 exerted on sector 8 is in a direction substantially parallel to the pivotal axes of members 5, 6 and levers 16, 20. No disturbance, therefore, is imparted by the clutching operation to any of the movable elements of our system in the signal-producing directions in which such elements responds to movements of bellows 1.

The force of spring 91 may be overcome, however, by another spring force urging surfaces 18 apart from their grip on sector 8 as shown in Fig. 2 until a solenoid 94 mounted on base 30 (Fig. 4) is energized to remove such other spring force, whereupon sector 8 is clamped between surfaces 18, as shown in Fig. 7. Solenoid 94 is of a conventional type, and it is contemplated that in use it will be excited from a suitable current source through a control switch readily accessible to the operator.

The spring force overcoming the tendency of surfaces 18 to grip sector 8 is derived from a pair of strip-springs 95, 96, one end of each of which is secured to a horizontal anchoring surface on center post 32. The other end of each spring is secured respectively to the side-legs of a horizontally-disposed, generally U-shaped member 97 having a base-leg 98 which is located outboard of the right-hand side of lever 16, as viewed in Figs. 2 and 7, while the side-legs of member 97 are located on opposite sides of the major vertical plane of lever 16. Transmission of the separating force of springs 95, 96 to the movable clamping surface occurrs via base-leg 98 and a bar 99 which is secured across the open end of Y-shaped member 93. Preferably the physical contact between bar 99 and base-leg 98 takes place between an upwardly projecting stub on bar 99 and a V-slot on the under side of base-leg 98 (Fig. 4). By this arrangement, not only are clamping surfaces 18 separated to permit free movement of clutch driver sector 8 therebetween, but lever 16 is also locked or caged against movement about its pivotal axis. Preferably, the orientation of the stub and slot is such as to cage lever 16 in the zero output position for pickoff 13.

Ideally, the operation of the clutch and the uncaging of lever 16 would always occur at precisely the same instant. Then there would be no opportunity whatever for lever 16 to depart from its null output position prior to the operation of the clutch. As a practical matter, however, such action is virtually unattainable. Therefore, we arrange our clutch-operating and caging mechanism to provide substantially simultaneous action, and provide a means for exerting a selected resilient couple on lever 16 sufficient to counteract any other resilient couple thereon (due, for example, to the strip-spring pivots of the lever) which would otherwise cause lever 16 to depart from null on being uncaged prior to the operation of the clutch. Preferably, this couple-exerting means comprises a coil spring 82 having one end secured to upper ear 78 of lever 16 and the other end secured to a nut 83 on a threaded rod-like element 84 vertically mounted on the top of center post 32. The tension of spring 82, hence the resilient couple exerted thereby on lever 16, is adjusted by rotating the nut 83, which may then be locked against further movement by means of a lock-nut 85. This arrangement, together with the caging arrangement, is provided in the preferred embodiment of our invention in lieu of the centering springs 17 shown at the end of lever 16 in Fig. 1.

A fine adjustment for the spacing between clamping elements 18 is provided by an arrangement for selectively adding to or subtracting from the fixed spring force exerted by strip-springs 95, 96 in holding the clamping elements apart. This arrangement preferably consists of a vertically-disposed helical spring 86 which is compressed between a flange on a screw shaft 87 and the top of a bridge-like element 88. Shaft 87 is threaded vertically into a horizontally-projecting bracket 89 secured to center post 32, and element 88 is connected to the side legs of member 97. By this arrangement, the fixed spring force of strip-springs 95, 96 may be modified by screwing shaft 87 up or down as needed to decrease or increase respectively the compression of spring 86, thereby to decrease or increase the spacing between clamping surfaces 18.

Solenoid 94 is provided for operating a lever 100 adapted to force base-leg 98 upwards against the force of springs 95, 96 so as to uncage pickoff lever 16 and permit spring 91 to operate the driven or clamping portion of the clutch. In this regard, lever 100 has one end thereof directly below an overhanging lip on a bridge-like element 101 connecting the side-legs of member 97. The other end of lever 100 is pivotally connected to the vertically-disposed plunger of solenoid 94, and a fulcrum is provided for the lever intermediate the ends thereof by the shaft of a horizontally-disposed screw 102 which is threaded into the side of an ear 103 upwardly projecting from the casing of solenoid 94.

Preferably, the portion of element 101 actually contacted by solenoid lever 100 is the bottom of a screw 104 which is vertically adjustable and lockable in the overhanging lip of said element. By this arrangement, we are enabled conveniently to select the point in the travel of lever 100 at which lever 100 begins to uncage pickoff lever 16 and simultaneously cause the operation of the clutch. And in order to prevent the plunger of solenoid 94 from moving from a predetermined ready position during deenergized periods of the latter, we preferably provide a slotted extension 107 projecting outwardly from the plunger end of lever 100. Passing through the slot of extension 107 is a vertically-disposed screw-shaft 108 threaded partially into the top of the solenoid casing. A helical spring 109 entwined about shaft 108 is kept under sufficient compression between the under side of extension 107 and the top of the solenoid casing such that the extension is continuously urged against the head of screw shaft 108 so as to prevent lever 100 from moving except on energization of the solenoid.

A limit stop arrangement for pickoff lever 16 is preferably provided by supplying the lever with an ear portion 105 which projects upwardly between the opposing ends of a pair of screws 106, each of which is threaded horizontally in the respective vertical legs of bridge-like element 101. Screws 106 are adjusted until the spacing between the end of each of them and the side of ear 105 adjacent thereto is such as to restrict the range of pivotal movement of pickoff lever 16 or armature 14 thereon to a selected maximum value, whereby the signal output of pickoff 13 is likewise restricted to a selected maximum value. In practice, we have found that an adjustment which limits the maximum range of movement of armature 14 to a value in the neighborhood of $\frac{1}{32}''$ is highly satisfactory.

In order to provide a convenient arrangement for finely adjusting the static balance of lever 16 and the dynamic balance of the coupled combination of levers 16, 20, we preferably provide a weight 67 affixed to lever 16 and movable in a direction perpendicular to the major plane of the lever, together with a pair of additional weights 68, 70 affixed to lever 16 on opposite sides of the lever's pivotal axis and movable in a direction parallel to such plane. Weight 67 forms the head of a screw which is threaded into upper ear 78 on lever 16, while weights 68, 70 form the heads respectively of screws which are threaded into ears 69, 71 provided on the lower side of lever 16. Weights 68, 70 are adjusted to statically balance lever 16 in its major plane while weight 67 is adjusted to statically balance the lever in a plane perpendicular to the major plane, whereby lever 16 is completely statically balanced about its pivotal axis. Then, without changing the ratio of their respective distances to the pivotal axis of lever 16, weights 68, 70 are further adjusted to vary the moment of inertia of lever 16 with respect to its pivotal axis relative to the moment of inertia of lever 20 with respect to its pivotal axis until the coupled combination of levers 16, 20 is dynamically balanced.

Compensating lever 20 is preferably of a generally T-shaped configuration having a cross-bar portion 110 which is vertically disposed with respect to base 30 and have a stem portion 111 horizontally disposed with respect to the base. The pivotal axis mounting of lever 20 which gives it a pivotal axis parallel to that of lever 16 is preferably provided by two pairs of orthogonally-arranged strip-springs 112, 113 respectively connecting the upper part of cross-bar 110 and the lower part thereof to corresponding orthogonally-arranged anchoring surfaces on center post 32. Like the anchoring surfaces for the strip-spring pivots of lever 16, the anchoring surfaces on post 32 for lever 20 are oriented such that in the absence of clutching, lever 20 tends to assume a position whereat stem portion 111 is generally parallel to the planes of end-walls 43, 47 of bellows 1.

Cup portion 23 of damper 21 is mounted at the foot of stem 111, while the threaded extension that bears static-balancing weight 22 is affixed to an ear 114 provided on cross-bar 110. Preferably, a pair of lock-nuts 115, 116 are provided for locking weight 22 against further movement over the threaded extension once the weight has been properly adjusted.

The pivotal connections of rigid link 19 to levers 16, 20 for constraining the latter to pivot only in counter directions preferably consist of a strip-spring 117 connecting one end of link 19 to lower ear 80 on lever 16 and by a strip-spring 118 connecting the other end of link 19 to a spacer block 119 integral with lever 20 and extending horizontally in the general direction of damper 21 from the lower part of cross-bar 110. As viewed in Figs. 2 and 3, the pivotal connection of link 19 to lever 20 is to the left of the pivotal axis mounting of lever 20 provided by strip-spring pairs 112, 113, while the pivotal connection of the link to lever 16 is to the right of the pivotal axis mounting of lever 16 provided by strip-spring pairs 75, 76. By this arrangement, upon energization of solenoid 94 the movements of bellows 1 are transmitted through the clutch to lever 16 and through link 19 to lever 20, the connection of the link being so placed in relation to the pivotal axes of these levers as to constrain the latter to pivot only in opposite directions. This constraint is equally effective during periods of non-operation of the clutch, such that acceleration forces applied generally to both levers and tending to pivot the latter in the same directions are completely thwarted since the levers can only pivot in opposite directions and their moments of inertia are so related as to result in a condition of dynamic balance.

Moreover, as previously described, the cylindrical members 5, 6 are also constrained to pivot only in opposite directions and are likewise insensitive to accelerations applied generally thereto. Hence, on connecting cylindrical members 5, 6 to levers 16, 20 through the clamping of clutch surfaces 18 onto clutch driver sector 8, the individual insensitivities of members 5, 6 and levers 16, 20 are preserved so as to produce an overall insensitivity of our apparatus to accelerations, whether or not bellows 1 is connected in driving relation to pickoff 13.

During ascent of an aircraft in which our apparatus is installed, bellows 1 expands so as to turn clutch driver sector 8 in a clockwise direction, as viewed in Fig. 3. Until solenoid 94 is energized, sector 8 turns freely in relation to clamping surfaces 18, i.e., the driven portion of the clutch. Moreover, levers 16, 20, together with surfaces 18, remain stationary in a null output position for signal generator 13 due to the caging action of the clutch operating mechanism in its unoperated state.

When a constant altitude is to be maintained, solenoid 94 is energized by the operator so as to cause both the actuation of the clutch and a substantially simultaneous uncaging of levers 16, 20. Further rotation of sector 8 is consequently transmitted to armature 14 of the signal generator, the signal output of which reverses in phase according to whether the craft falls or rises from the altitude to be maintained. This signal output is fed into the elevator control channel of an automatic pilot of conventional design so as to actuate the aircraft's elevator surfaces in a sense to reestablish the altitude at which the clutch was actuated.

Since many changes could be made in the above construction and many apparently widely different embodiments of our invention could be made without departing from the scope thereof, it is intended that all matter contained in the above description or shown in the accompanying drawings shall be interpreted as illustrative and not in a limiting sense.

What is claimed is:

1. In a device having a driving unit, a driven unit, and a clutch, including rotatably mounted driver and driven halves, operable to connect said driving unit in actuating relation to said driven unit, first motion transmission means connecting said driving unit to the driver half of said clutch, second motion transmission means connecting said driven unit to the driven half of said clutch, said driven half of the clutch comprising a pair of opposed clamping surfaces, said driver half comprising a thin planar member freely interposed between said clamping surfaces, and clutch-operating means operable to clamp said clamping surfaces to said planar member, said first transmission means being arranged for rotating said planar member in the plane thereof about an axis parallel to the direction of the clamping force exerted thereon by said clamping surfaces, said second transmission means including first and second lever assemblies respectively mounted for rotation about spaced axes parallel to the axis of rotation of said driver clutch-half, and a substantially rigid link pivotally connected to each of said lever assemblies so as to constrain one assembly to rotate in an opposite sense relative to rotation imparted to the other assembly, the moments of inertia of said lever assemblies being so related as to prevent any net response of said assemblies to forces of acceleration tending to rotate the same in like directions.

2. In combination, a clutch including rotatably mounted driver and driven halves operable to connect a driving element in actuating relation to a driven element, first motion transmission means connecting said driving element to the driver half of said clutch, second motion transmission means connecting said driven element to the driven half of said clutch, said driven half of the clutch comprising a pair of opposed clamping surfaces, said driver half comprising a thin planar member freely interposed between said clamping surfaces, and clutch-operating means operable to clamp said clamping surfaces to said planar member, said first transmission means being arranged for rotating said planar member in the plane thereof about an axis parallel to the direction of the clamping force exerted thereon by said clamping surfaces, said second transmission means including a first lever assembly mounted for rotation about the rotational axis of said planar member, a second lever assembly mounted for rotation about an axis parallel to said first lever axis, and a substantially rigid link pivotally connected to each of said lever assemblies so as to constrain one assembly to rotate in an opposite sense relative to rotation imparted to the other assembly, the moments of inertia of said lever assemblies being so related as to prevent any net response of said assemblies to forces of acceleration tending to rotate the same in like directions.

3. In combination, a clutch including rotatably mounted driver and driven halves adapted for connecting a driving member in actuating relation to a driven member, a motion transmission means connecting said driving member to the driver half of said clutch for rotating said driver half about a first axis, a first lever assembly mounted for rotation about said first axis including the driven half of said clutch, said driver half being a thin planar member arranged such that its plane surfaces are perpendicular to said first axis, said driven half comprising a plurality of clamping surfaces operable to clamp on to said driver half so as to be driven thereby, a second lever assembly mounted for rotation about a second axis parallel to the first, one of said lever assemblies including one part of said driven member, a substantially rigid link pivotally connected to each of said lever assemblies so as to constrain one assembly to rotate in an opposite sense relative to the other, the moments of inertia of said lever assemblies being so related as to prevent any net response of said assemblies to forces of acceleration tending to rotate the same in like directions, and clutch-operating means for operating said clamping surfaces.

4. A device having substantial freedom from adverse effects due to vibrations and accelerations, said device comprising a driving unit, a pair of mass elements pivoted for rotation about respective parallel axes lying in a plane perpendicular to the axis of said driving unit, means connecting said driving unit to said mass elements for rotating the latter through like angular distances in opposite directions in response to movement of said driving unit, one of said mass elements including the driver part of a two-part clutch, the moments of inertia of said mass elements being so related as to prevent any net response of said mass elements to forces of acceleration tending to rotate the same in like directions, said driver part comprising a member extending from said one of said mass and movable in a plane substantially perpendicular to the plane containing said mass element axes, a driven unit, connecting means for connecting said driven part of said clutch to said driven unit, said connecting means including first and second levers mounted for rotation about respective parallel spaced axes mutually perpendicular to the plane of movement of said driver clutch-part, and a link pivotally connected to each of said levers so as to constrain one lever to rotate in an opposite sense relative to rotation imparted to the other lever, the moments of inertia of said levers being so related as to prevent any net response of said levers to forces of acceleration tending to rotate the same in like directions, and means for engaging said clutch-parts.

5. A device having substantial freedom from adverse effects due to vibrations and accelerations, said device comprising a driving unit, a pair of mass elements symmetrically disposed on opposite sides of said driving unit and pivoted for rotation about first respective parallel axes lying in a plane perpendicular to the axis of said driving unit, means connecting said driving unit to said mass elements for rotating the latter through like angular distances in opposite directions on movement of said driving unit, means for adjusting the mass distribution of said mass elements for dynamically balancing the same, one of said mass elements including the driver part of a two-part clutch, a driven unit, connecting means for connecting said driven part of said clutch to said driven unit, said connecting means including first and second levers mounted for rotation about second respective parallel axes, at least one axis of said second axes being parallel to said first axes, and a link pivotally connected to each of said levers so as to constrain one lever to rotate in an opposite sense relative to rotation imparted to the other lever, means for adjusting the mass distribution of said levers for dynamically balancing the same, and means for engaging said clutch-parts.

6. In combination, a driving unit, a driven unit, and a clutch including rotatably mounted driver and driven halves operable to connect said driving unit in actuating relation to said driven unit, first motion transmission means connecting said driving unit to the driver half of said clutch, second motion transmission means connecting said driven unit to the driven half of said clutch, said first transmission means including first and second levers mounted for rotation about respective parallel axes and pivotally connected to each other so as to constrain one lever to rotate in an opposite sense relative to rotation imparted to the other lever, said second transmission means including third and fourth levers mounted for rotation about respective parallel axes and pivotally connected to each other so as to constrain one lever to rotate in an opposite sense relative to rotation imparted to the other lever.

References Cited in the file of this patent

UNITED STATES PATENTS

| | | |
|---|---|---|
| 337,826 | Fahrney | Mar. 16, 1886 |
| 1,295,003 | Chandler | Feb. 18, 1919 |
| 1,577,460 | Franca | Mar. 23, 1926 |
| 1,693,346 | Peterson | Nov. 27, 1928 |
| 1,830,224 | Calabrese | Nov. 3, 1931 |
| 1,973,510 | Schieferstein | Sept. 11, 1934 |
| 1,993,413 | Mellon | Mar. 5, 1935 |
| 2,066,131 | White | Dec. 29, 1936 |
| 2,101,671 | Cooper | Dec. 7, 1937 |
| 2,385,011 | Lurtz | Sept. 18, 1945 |
| 2,678,178 | MacCallum | May 11, 1954 |
| 2,680,580 | Rossire | June 8, 1954 |
| 2,687,648 | Konet | Aug. 31, 1954 |
| 2,689,951 | Argentieri | Sept. 21, 1954 |
| 2,735,731 | Freebairn et al. | Feb. 21, 1956 |